US00RE38874E

(19) United States
(12) Reissued Patent
Bieker et al.

(10) Patent Number: US RE38,874 E
(45) Date of Reissued Patent: Nov. 15, 2005

(54) DISC BRAKE FOR VEHICLES HAVING INSERTABLE ACTUATOR

(75) Inventors: Dieter Bieker, Oberaudorf (DE); Hans Baumgartner, Moosburg (DE)

(73) Assignee: Knorr-Bremse Systeme fuer Nutzfahrzeug GmbH, Munich (DE)

(21) Appl. No.: 09/915,569

(22) PCT Filed: Feb. 1, 1996

(86) PCT No.: PCT/DE96/00193

§ 371 (c)(1),
(2), (4) Date: Oct. 27, 1997

(87) PCT Pub. No.: WO96/34216

PCT Pub. Date: Oct. 31, 1996

Related U.S. Patent Documents

Reissue of:
(64) Patent No.: 5,927,445
Issued: Jul. 27, 1999
Appl. No.: 08/945,457
Filed: Oct. 27, 1997

(30) Foreign Application Priority Data

Apr. 27, 1995 (DE) ..... 19 515 063

(51) Int. Cl.[7] ..... F16D 55/02
(52) U.S. Cl. ..... 188/72.9; 188/71.1
(58) Field of Search ..... 188/71.1, 71.9, 188/72.7, 72.8, 72.9, 73.31, 73.47

(56) References Cited

U.S. PATENT DOCUMENTS

| | | | |
|---|---|---|---|
| 3,517,777 | A | 6/1970 | Beller et al. |
| 3,724,616 | A | 4/1973 | Burnett |
| 3,734,243 | A | 5/1973 | Girauldon |
| 3,741,350 | A | 6/1973 | Knapp |
| 3,830,343 | A | 8/1974 | Gardner |

(Continued)

FOREIGN PATENT DOCUMENTS

| | | | |
|---|---|---|---|
| DE | 2400470 | | 7/1974 |
| DE | 2614321 | A1 | 10/1976 |
| DE | 2649666 | A1 | 5/1977 |
| DE | 2603109 | | 8/1977 |
| DE | 3213356 | A1 | 11/1982 |

(Continued)

OTHER PUBLICATIONS

United States Court of Appeals for the Federal Circuit's Order dated Sep. 29, 2003.

Plaintiff Knorr–Bremse's Supplemental Brief dated Oct. 27, 2003.

Defendants, Dana and Haldex's Supplemental Brief dated Oct. 27, 2003.

Perrot, Mechanische Gleitsattelbremsen, Typ 1000 V–G/1600 V–G/2000 V–G.

Man Nutzfahrzeuge Aktiengesellschaft, Lucas Scheibenbremse D3, Reparaturanleitung p. 102, 1992.

(Continued)

*Primary Examiner*—Christopher P. Schwartz
(74) *Attorney, Agent, or Firm*—Crowell & Moring LLP

(57) ABSTRACT

A brake disk for road vehicles has a brake caliper engaging about a brake disk of a vehicle wheel to be braked. A clamping unit upon which an actuation cylinder can act is provided on one side of the brake disk and which itself acts against at least one pressure member. In order to withstand the braking forces in a manner free from sealing problems, the caliper is constructed in one part such that the clamping unit is mounted in a section of the caliper which is substantially closed on all sides. When the caliper is moved away from the brake disk, the clamping unit can be introduced, in the form of a preassembled unit into the caliper through the opening therein facing the brake disk. When the clamping unit has been introduced, the opening in the brake caliper facing the brake disk is closed by a closure plate penetrated by the pressure member of the clamping unit.

98 Claims, 4 Drawing Sheets

U.S. PATENT DOCUMENTS

| | | | |
|---|---|---|---|
| 3,837,437 | A | 9/1974 | Martins |
| 3,937,304 | A | 2/1976 | Brix |
| 3,967,705 | A | 7/1976 | Johannesen et al. |
| 4,018,310 | A | 4/1977 | Ritsema et al. |
| 4,071,118 | A | 1/1978 | Johannesen |
| 4,109,765 | A | 8/1978 | Johannesen |
| 4,184,571 | A | 1/1980 | Karasudani |
| 4,222,310 | A | 9/1980 | Garrett et al. |
| 4,378,863 | A | 4/1983 | Baum |
| 4,465,164 | A | 8/1984 | Anderson |
| 4,522,286 | A | 6/1985 | Villata et al. |
| 4,681,194 | A | 7/1987 | Tsuruta |
| 4,693,341 | A | 9/1987 | Drott |
| 4,705,147 | A | 11/1987 | Pressaco et al. |
| 4,809,822 | A | 3/1989 | Margetts |
| 5,433,298 | A | 7/1995 | Antony et al. |
| 5,547,048 | A | 8/1996 | Anthony |
| 5,590,742 | A | 1/1997 | Gutelius |
| 5,833,035 | A | 11/1998 | Severinsson |
| 5,960,914 | A | 10/1999 | Isai |

FOREIGN PATENT DOCUMENTS

| | | | |
|---|---|---|---|
| DE | 3423875 | A1 | 1/1985 |
| DE | 3610569 | A1 | 10/1987 |
| DE | 3716202 | A1 | 11/1988 |
| DE | 3348359 | C2 | 5/1991 |
| DE | 4032885 | A1 | 4/1992 |
| DE | 4032886 | A1 | 4/1992 |
| DE | 4131631 | | 3/1993 |
| DE | 4307019 | A1 | 9/1994 |
| EP | 0145535 | | 6/1985 |
| EP | 0182336 | B1 | 6/1988 |
| EP | 0271864 | A2 | 6/1988 |
| EP | 0478917 | A1 | 4/1992 |
| EP | 0495311 | A1 | 7/1992 |
| EP | 0436906 | B1 | 3/1994 |
| FR | 2306372 | | 10/1976 |
| GB | 2090355 | A | 7/1982 |
| GB | 2102088 | | 1/1983 |
| JP | 646423 | | 6/1989 |
| JP | 32022 | | 1/1991 |
| JP | 414670 | | 1/1992 |
| JP | 429141 | | 1/1992 |
| SU | 1657070 | A3 | 6/1991 |
| WO | WO96/12900 | | 5/1996 |

OTHER PUBLICATIONS

Man Perrot Scheibenbremse 1000 V–G, Reparaturanleitung, p. 103, 1994.

Montage Im Maschinenbau, VEB Verlag Technik Berlin, 1974, 1978.

Plaintiff Knorr–Bremse's Opposition to Defendant Haldex Brake Products Corporation's Motion For Partial Markman Determination and Summary Judgment of Non–Infringement. (Filed with the Court on Sep. 29, 2000) (Docket No. 62).

Plaintiff Knorr–Bremse's Motion for Claim Construction. (Filed with the Court on Oct. 18, 2000) (Docket No. 83).

Knorr Bremse's Supplemental Opposition and Cross–Motion for Partial Summary Judgement of Literal Infringement of Mark III. (Filed with the Court on Oct. 23, 2000) (Docket No. 98).

Plaintiff Knorr–Bremse's Trial Brief. (Filed with the Court on Jan. 10, 2001) (Docket No. 195).

Knorr–Bremse's Sur Reply to Haldex's Supplemental Reply To Its Motion For Summary Judgment Of Non–Infringement And Opposition To KB's Motion For Summary Judgment Of Literal Infringement Of The Mark III. (Filed with the Court on Nov. 6, 2000) (Docket No. 128).

Nov. 27–28, 2000 Markman Hearing transcript.

Excerpts of Deposition Transcript of Hans Baumgartner. (Deposition taken on Aug. 16–17, 2000).

Trial Transcript, Monday, Jan. 8, 2001. See pp. 28–34, 100–101, 103–104, 108, 135–136.

Submission of Supplemental Expert Report of Dr. James A. Kirk. (Served on Oct. 26, 2000).

Docket sheet for *Knorr–Bremse* v. *Dana Corp. et al.*, Civil Case No. 1:00cv803. (E.D.Va.).

Knorr–Bremse's Federal Circuit Appeal Brief, pp. 18–22 and 45–48 (dated Aug. 27, 2001).

Photographs (4) of Knorr–Bremse SB7 air disk brakes (attached as Exhibit A to the Preliminary Amendment filed on May 17, 2002).

Photographs (2) of a Dana–Haldex Mark II air disk brake (attached as Exhibit B to the Preliminary Amendment filed on May 17, 2002).

Photographs (2) of a Dana–Haldex Mark III air disk brake (attached as Exhibit C to the Preliminary Amendment filed on May 17, 2002).

Photograph of a Knorr–Bremse SN7 air disk brake (attached as Exhibit D to the Preliminary Amendment filed on May 17, 2002).

Photographs (2) of a Haldex Mark I air disk brake (attached as Exhibit E to the Preliminary Amendment filed on May 17, 2002).

Haldex Opposition to validity of Knorr–Bremse's EP 824 639 (dated Apr. 26, 2000).

Knorr–Bremse submission supporting validity of EP 824 639 (dated Nov. 21, 2000).

Haldex submission opposing validity of EP 824 639 (dated Mar. 26, 2001).

Preliminary EPO Opinion regarding validity of EP 824 639 (dated Aug. 13, 2001).

Knorr–Bremse submission supporting validity of EP 824 639 (dated Sep. 6, 2001).

Haldex submission opposing validity of EP 824 639 (dated Oct. 4, 2001).

Official EPO notes of opposition hearing (dated Dec. 17, 2001).

EPO Decision upholding validity of EP 824 639 (dated Dec. 17, 2001).

Lucas Opposition to validity of Knorr–Bremse's DE 195 15 063 (dated May 6, 1997).

Perrot Opposition to validity of DE 195 15 063 (dated May 6, 1997).

Knorr–Bremse's submission supporting validity of DE 195 15 063 (dated Dec. 10, 1997).

Perrot submission opposing validity of DE 195 15 063 (dated Apr. 30, 1998).

Haldex statement joining opposition to DE 195 15 063 (dated May 19, 1998).

Knorr–Bremse submission supporting validity of DE 195 15 063 (dated Nov. 2, 1998).

Lucas submission opposing validity of DE 195 15 063 (dated Nov. 17, 1998).

Knorr–Bremse submission supporting validity of DE 195 15 063 (dated Feb. 12, 1999).

Perrot submission opposing validity of DE 195 15 063 (dated Apr. 15, 1999).
Knorr–Bremse submission supporting validity of DE 195 15 063 (dated Aug. 13, 1999).
Haldex submission opposing validity of DE 195 15 063 (dated Dec. 8, 1999).
Knorr–Bremse submission supporting validity of DE 195 15 063 (dated Mar. 3, 2000).
GPO Decision upholding validity of DE 195 15 063 (dated Mar. 3, 2000), and English translation thereof.
Haldex appeal of GPO Decision upholding validity of DE 195 15 063 (dated Aug. 11, 2000).
Decision affirming GPO on validity of DE 195 15 063 (dated Jan. 25, 2001).
Haldex submission contesting infringement of DE 195 15 063 and EP 824 639 (dated Aug. 14, 2000).
Dusseldorf Court Decision finding infringement of Haldex product (dated Oct. 5, 2000).
*Knorr–Bremse Systeme Fuer Nutzfahrzeuge GmbH* v. *Dana Corp. et al.*, Civil Action No. 00–803–A, Findings of Fact and Conclusions of Law, 133 F. Supp.2d 843 (E.D. Va Feb. 20, 2001).
*Knorr–Bremse Systeme Fuer Nutzfahrzeuge GmbH* v. *Dana Corp. et al.*, Civil Action No. 00–803–A, Memorandum Opinion, 133 F. Supp.2d 833 (E.D. Va Feb. 20, 2001).
Defendants' Answer to the Second Amended Complaint, Oct. 30, 2000.
Haldex Brake Corporations's Answer to Interrogatory No. 6 in Response to Plaintiff, Knorr–Bremse's First Set of Interrogatories, pp. 1, 6–7 and 21, Sep. 21, 2000.
Dana Corporation's Answer to Interrogatory No. 5 in Response to Plaintiff, Knorr–Bremse's First Set of Interrogatories, pp. 1, 3–4 and 12, Jul. 3, 2000.
Defendant Haldex Corporation's Opposition to Plaintiff's Motion for Partial Summary Judgment of Literal Infringement By Haldex's Mark II, pp. 1, 10 and 29, Oct. 30, 2000.
Plaintiff Knorr–Bremse's Reply to Haldex's Opposition to Knorr–Bremse's Motion for Partial Summary Judgment of Patent Infringement, pp. 1, 15, and 17, Nov. 2, 2000.
Defendants' Trial Brief, pp. 15–19.
Trial Transcript, "Declaration of Donald Johannesen", pp. 201–203, Jan. 10, 2001.
Reporter's Transcript, Excerpts from Markman Hearing, pp. 1, 2, 11 and 179, Nov. 27 and 28, 2000.
Reporter's Transcript, Excerpts from the second day of trial, pp. 1, 2, 53–64, and 80–83, Jan. 9, 2001.
Reporter's Transcript, Excerpts from the second day of trial, pp. 93–94, 123–141, Jan. 9, 2001.
Reporter's Transcript, Excerpts from the third day of trial, pp. 1–2, 37–50, 152–153, and 160, Jan. 10, 2001.
Reporter's Transcript, Excerpts from the third day of trial, pp. 103–104, 170–190, 200–203, 207–208, 210–212, 215–220, Jan. 10, 2001.
Reporter's Transcript, Excerpts from the last day of trial, pp. 1–2, 6–11, 59–60, 77–82, Jan. 11, 2001.
U.S. District Court for Eastern District of Virginia, Docket Sheet, as of May 24, 2001.
Defendants/Appellants' Dana Corp. et al., Excerpts of Appeal Brief, pp. 8–914–15, 21, 23, 37–47–, and 51, Jul. 16, 2001.
Perrot, "Mechanisch Gleitsatteelbremsem Typ 100 V–G/1600 V–G/200–G".
Man Lucas, "Scheibenbremse D3 mit automatischer Nachstellung", 1992.
Man Perrot, "Scheibenbremse 100 V– G mit automatischer Nachstellung", 1994.
Richter, Schilling, Weise, "Montage im Maschinenbau", pp. 59–60.
Knorr–Bremse, "Pneumatic Disc Brakes for Trucks, Trailers and Buses", pp. 1–7.
Knorr–Bremse, "Service Manual Pneumatic Disc Brake Bendix ADB 3700/ADB 4300 (for IVECO Commercial Vehicles)", pp. 1–31.
Jerry Standley, "A Comparative Overview of Air Disc Brake Designs", pp. 13–22.
Sigmar Micke, Richard E. Thompson and Bernd–Holger Roechling, "SAE Technical Paper Series", 1990, pp. 1–8.
Proceedings of the Institution of Mechanical Engineers, "Disc Brakes for Commercial Vehicles", pp. 63–70.
Colette Bremsenbauarter, Drawing.
The Bendix Advantage, single sheet brochure.
"Die Knorr–Scheibenbremse–Feststellbremse", Drawing.
Engineering Drawing of Allied Signal/Bendix, Jul. 9, 1992.
Engineering Drawing of Allied Signal/Bendix, Dec. 9, 1992.

* cited by examiner

DISC BRAKE FOR VEHICLES HAVING INSERTABLE ACTUATOR

Matter enclosed in heavy brackets [ ] appears in the original patent but forms no part of this reissue specification; matter printed in italics indicates the additions made by reissue.

The invention relates to a disk brake for road vehicles, having a caliper and which comprises a brake disk with a brake application unit arranged on one side, the application unit having a rotary lever swivellable by an operating cylinder, the rotary lever being capable of acting by means of an eccentric onto a bridge which can be displaced against a spring force in the direction of the brake disk has at least one adjusting spindle provided with a pressure scheme.

In the case of disk brakes of the above-mentioned type (German Patent Document DE-OS 40 32 886), a brake application device, which is equipped with a rotary lever which can be acted upon by an operating cylinder, is provided inside the rearward part of a caliper comprising a brake disk, which application device has a bridge which carries two adjusting spindles having pressure pieces and is slidably supported on the caliper. The end of the rotary lever which eccentrically acts upon the portion of the bridge facing away from the brake disk is supported on the rearward end of the caliper by means of slide bearing or roller bearing elements. The rearward section of the caliper is constructed as a separate housing which can be screwed together with the caliper along a separating line. During the operation of the brake, the brake response forces are introduced in a rearward manner into the screwed-on housing section which can cause problems concerning the screwed connection, the stability and the sealing, particularly during the service lives required in the case of disk brakes of the concerned type. Problems of the above-mentioned type may also occur in the case of disk brakes which are constructed with only one adjusting or pressure spindle.

Based on the above, it is the object of the invention to further develop a disk brake of the above-mentioned type such that the brake response forces can be introduced into the brake caliper without any problems. In particular, sealing areas existing at the caliper must be completely unaffected by the braking or brake response forces in order to ensure the required operational reliability during long service lives of the brake system.

This object is achieved according to preferred embodiments of the present by providing a disk brake of the above mentioned type, wherein a) the caliper is constructed in one piece such that the section of the caliper receiving the application unit is largely closed in a rearward area facing away from the brake disk, with the exception of an opening for the access of the operating cylinder, and b) the application unit can be inserted as a preassembled unit into the caliper through the opening facing the brake disk when the caliper is removed from the brake disk.

Because of the one-piece design of the caliper, which in a cost-saving manner may be constructed as a cast part, a direct transmission of the braking forces into the caliper is permitted since the rearward area, which faces away from the brake disk, of the caliper receiving the application unit is essentially closed with the exception of the through-grip opening for the operating cylinder. The application unit, including all its components, can be introduced as a preassembled unit when the caliper is removed from the brake disk through the opening facing the brake disk. After the introduction of the application unit, this opening of the caliper can preferably be closed by a closing plate which, in the case of a two-spindle brake disk construction, is penetrated in a sealing manner by the pressure pieces on the forward ends of the adjusting spindles. The application unit can be constructed as a preassembled unit by means of simple holding or clamping elements. Its position inside the section of the caliper acting as the housing is determined by the supporting roller which is supported on the interior side on the rearward wall section of the caliper and, facing the brake disk, is determined by the pressure spring which tensions the application unit in a rearward manner and is supported on the closing plate.

Other objects, advantages and novel features of the present invention will become apparent from the following detailed description of the invention when considered in conjunction with the accompanying drawings.

DETAILED DESCRIPTION OF THE DRAWINGS

Figure 1:
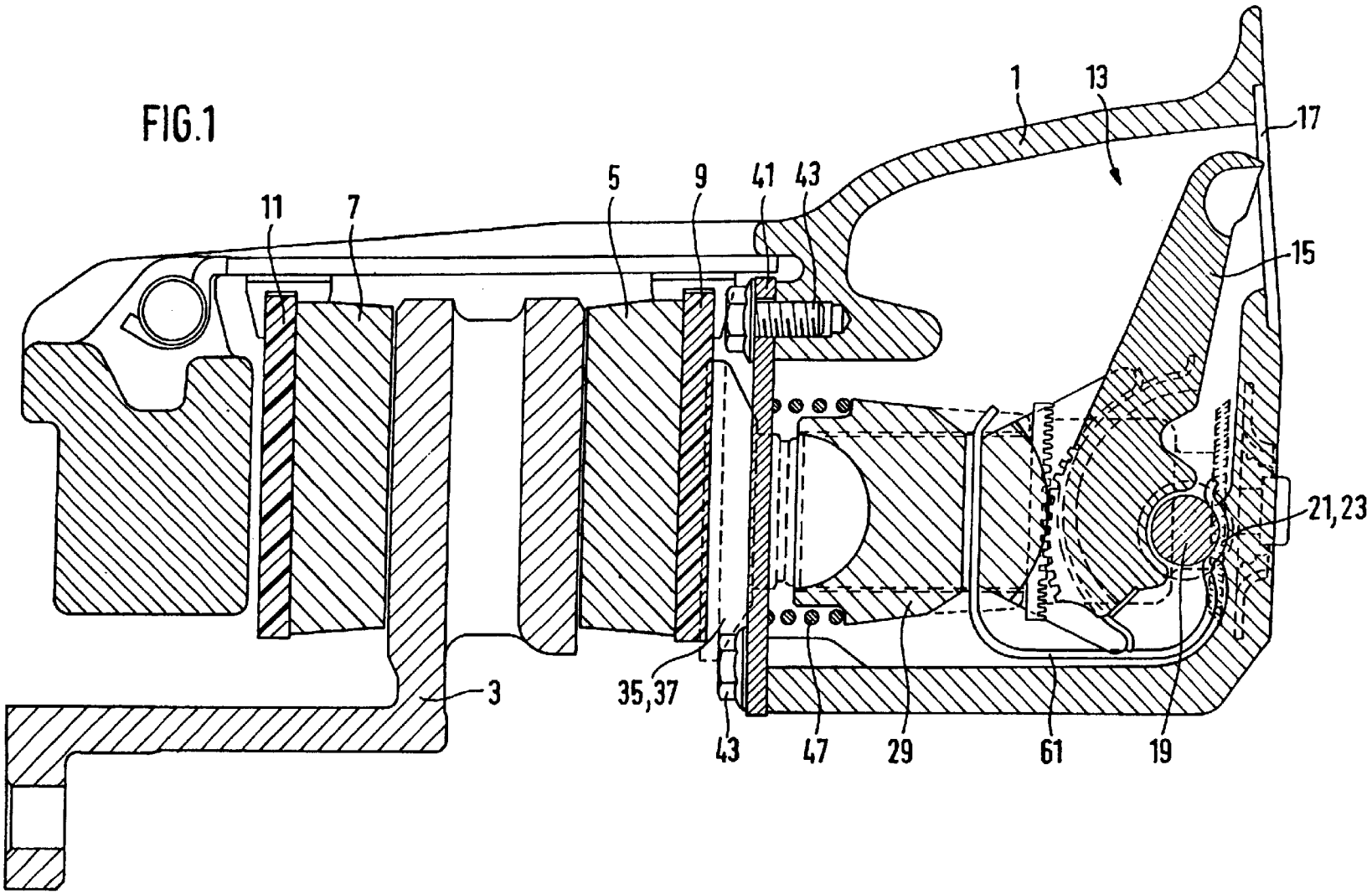
FIG. 1 is a longitudinal sectional view of a disk brake illustrating the one-piece caliper with the application unit which is inserted in the caliper in a preassembled manner.

FIG. 1 of the drawing is a sectional view of a disk brake with a caliper 1 which comprises a brake disk 3 assigned to a vehicle wheel to be braked. On both sides of the brake disk, brake shoes 5 and 7 are supported on the caliper. On a support (not shown), the caliper is displaceably guided transversely with respect to the brake disk 3 such that, when the brake is operated, by means of the brake cylinder 8 which is outlined in FIG. 4, the brake linings 9 and 11 of the above-mentioned brake shoes come to rest against the brake disk.

According to the invention, the caliper 1 is constructed in one piece; that is, the section which is situated on the right in the drawing of FIG. 1 and receives an application unit 13 and the section comprising the brake disk 3 are constructed in one piece as a cast part or forged part. The application unit 13 has a rotary lever 15 which, in the view according to FIG. 1, projects from the application unit in the direction of an opening 17 situated on the rearward end of the caliper 1 and can be swiveled about an axis of a supporting roller 19 situated perpendicularly to the axis of the brake disk. The supporting roller is rotatably guided on support bearings 21 and 23 which are constructed on the interior side on the rearward section of the one-piece caliper 1. The end of the rotary lever which is on the bottom in the figure rests by means of two semicylindrical steps 25 and 27 against a bridge 29 in which, in an axially symmetrical manner with a thread mesh two adjusting spindles 31 and 33 are guided by means of pressure pieces 35 and 37 constructed on these adjusting spindles and facing the brake disk. The center of rotation of the two semicylindrical steps 25 and 27 on the lower end of the rotary lever 15 is offset with respect to the axis of the support roller 19 such that, when the rotation of the rotary lever 15 extends counterclockwise according to FIG. 1, an eccentric operation takes place with respect to the bridge 29 and therefore the adjusting spindles 31 and 33 screwed to the bridge can be shifted in the direction of the brake disk. The arrangement described so far consisting of the rotary lever, the eccentric bearing, the bridge and the adjusting spindles corresponds to a construction of a pneumatically applied disk brake which is known per se. The bearing of the rotary lever 15 and the transfer of the eccentricity into the longitudinal displacement of the bridge can also correspond to another construction in the case of which, in a reversal of the arrangement, the supporting roller faces the bridge and acts upon it as an eccentric while the lever section which is on the bottom according to FIG. 1 is swivellably supported on the rear side of the caliper, for example, by means of slide bearings or roller bearings.

For the lateral support of the bridge 29, sliding elements 39 are provided which, when the brake is operated, absorb circumferential forces arriving by way of the pressure pieces and divert them to the caliper. The sliding elements 39 may consist of steel and have the shape of cylindrical bodies. However, sliding elements of a different configuration may also be used.

According to FIG. 1, the section of the one-piece caliper which receives the application unit 13 is closed off on the front side, that is, in the position facing the brake disk, by means of a closing plate 41. By means of studs 43, the closing plate 41 is screwed to the caliper in the manner illustrated in FIG. 1, sealing elements being placed in the sealing surfaces between the closing plate and the caliper. Each of the pressure pieces 35, 37 is surrounded by bellows 45 which, on their circumference, are clamped to the closing plate such that the passages of the pressure pieces are securely sealed off with respect to the interior of the caliper. In the center part of the bridge, a pressure spring 47 is supported which loads the bridge in the distance direction of the brake disk 3.

Figure 3:
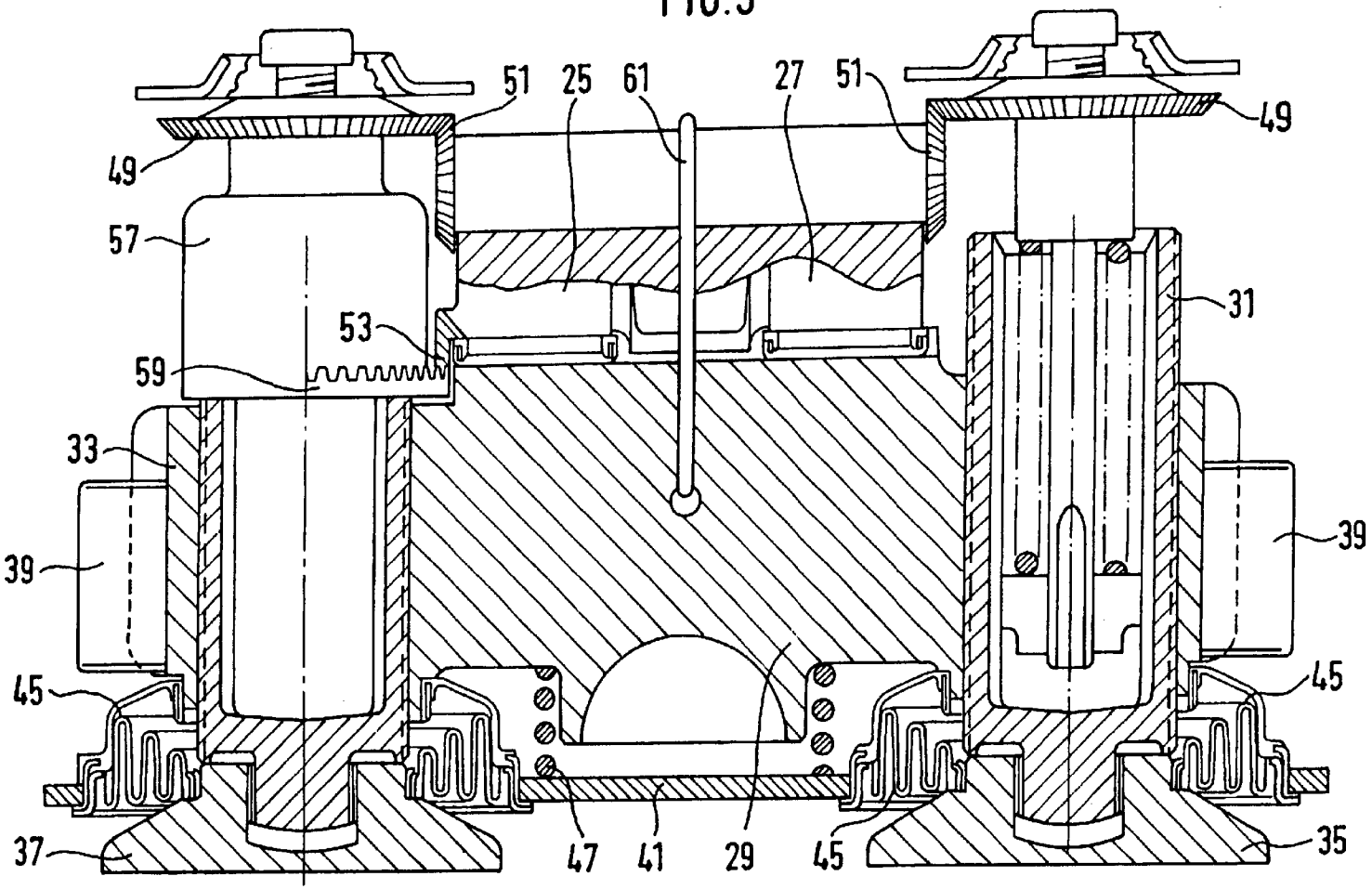
FIG. 3 is a partially sectional bottom view of the preassembled application unit according to FIG. 2.
Figure 4:
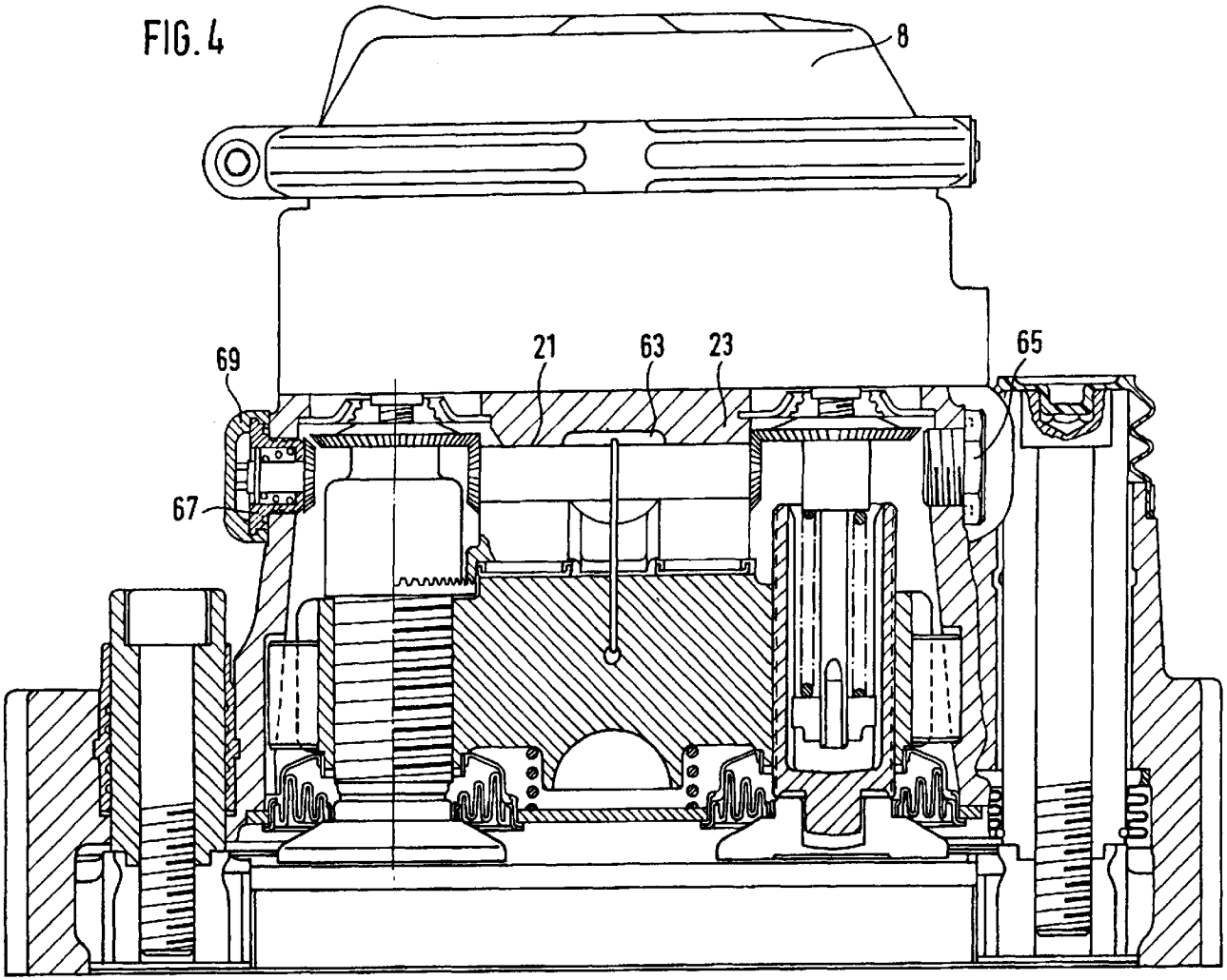
FIG. 4 is a view which corresponds to the representation according to FIG. 3 of the application unit in the installed position inside the caliper with an operating cylinder attached to the rearward end of the caliper for acting upon the rotary lever.

In the interior of the adjusting spindle 33 illustrated on the left side in FIGS. 3 and 4, a resetting device (not shown) is situated which operates in a manner known per se and which is capable of triggering a relative screwed connection of the adjusting spindle in the direction of the brake disk, a synchronizing device being provided which can transmit the resetting motion to the adjusting spindle 31 illustrated on the right in FIGS. 3 and 4. In a manner not explained in detail, bevel wheels 49 are disposed on the rearward ends of the two adjusting spindles 31 and 33 and mesh with bevel wheels 51 situated on the front-side ends of the supporting roller 19. The bevel wheels 51 are either directly connected with the supporting roller ends or they are situated at the ends of a shaft (not shown) which is rotatably guided in the interior of the supporting roller. At the end of the step 25 of the rotary lever which is on the left side in FIGS. 3 and 4, a gear wheel section 53 is constructed which meshes with a gear wheel 59 rotatably connected with the bevel wheel 49 by means of a sleeve 57. Rotating movements of the gear wheel section 53 triggered when the rotary lever 15 is operated result in a rotating movement of the gear wheel 59 and therefore in a rotating movement of the bevel wheel 49. By way of the bevel wheel connection, a transmission of the rotating movement takes place to the bevel wheel 49 assigned to the adjusting spindle 31 such that rotating and resetting movements, which are not explained in detail, are transmitted by means of the synchronizing device of the above-explained type to both adjusting spindles and a uniform contact pressure of the pressure pieces is ensured with respect to the brake disk.

Figure 2:
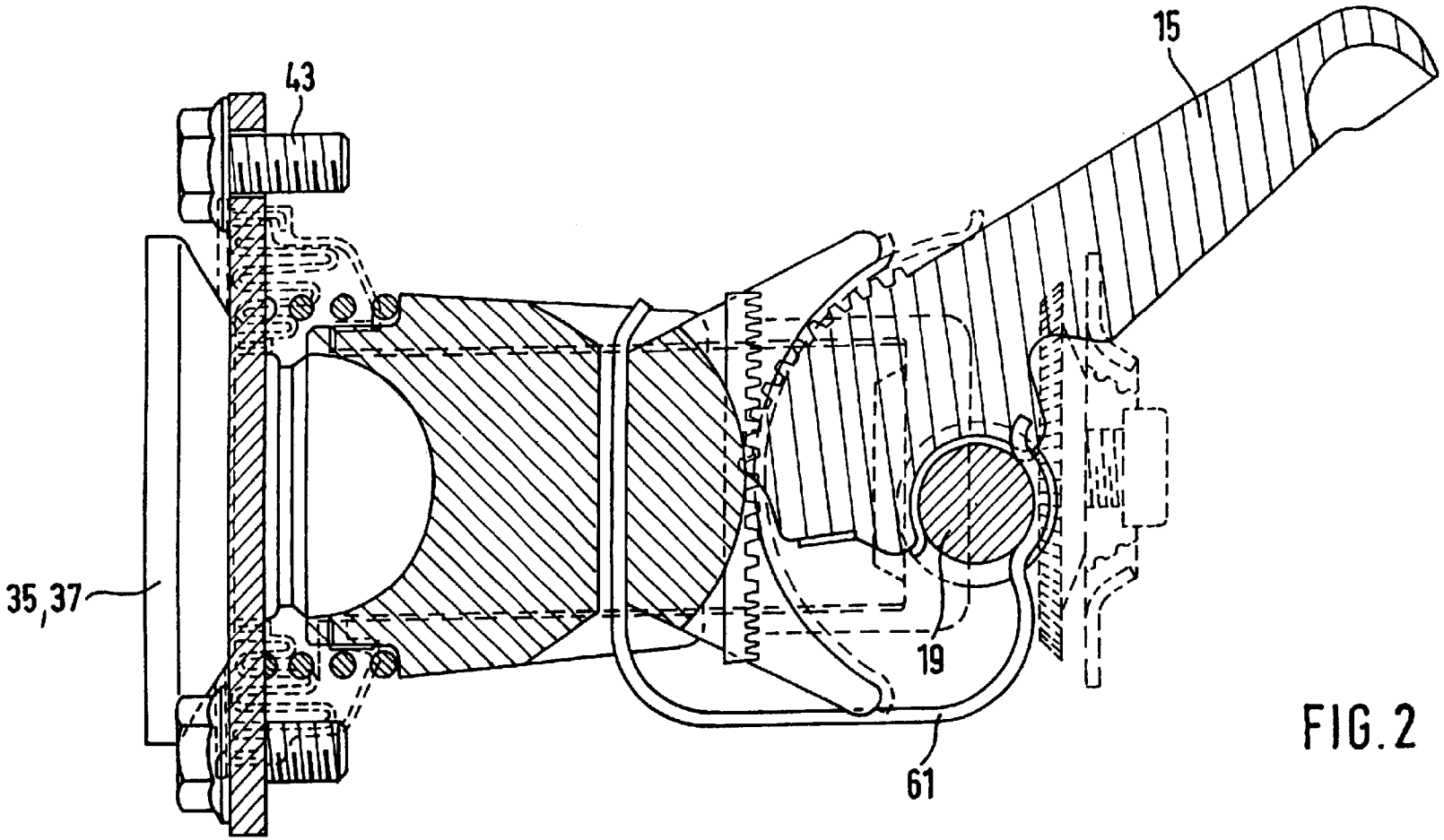
FIG. 2 and is an individual sectional view of the preassembled application unit.

The operating device described above is illustrated in FIG. 2 of the drawing in a mounted position in which it is held together by means of a bow spring 61. In the embodiment, which is shown only as an example, the bow spring 61 reaches in the center through the bridge 29 and is suspended in a bent manner at the area of the bridge which is on top in FIG. 2, while the section of the bow spring 61 which is on the bottom according to FIG. 2 is guided in a rearward manner and under spring tension is suspended in the center on the supporting roller 19. FIG. 4 of the drawing shows that a recess 63 is provided in the rearward area of the caliper, through which recess 63 the bow spring 61 extends in an upwardly directed manner partially reaching around the supporting roller (FIG. 2).

The bow spring 61 is only an embodiment of a device by means of which the individual components of the application device, including the closing plate 41 and the pressure pieces 35, 37 are held together as a unit in a manner illustrated in FIG. 2. When the caliper is removed from the brake disk, the preassembled unit illustrated in FIG. 2 is inserted in the opening of the caliper facing the brake disk until, starting from the position according to FIG. 2, the end of the rotary lever 15 has taken up the swivel position according to FIG. 1 inside the caliper. After the introduction into the caliper, the studs 43 with the fitted-on closing plate 41 are screwed with respect to the caliper, whereby the end facing the brake disk is sealed off in the manner described above. The rearward end of the preassembled unit, that is, the end which is on the right according to FIG. 1, is supported by means of the supporting roller 19 and with the tensioning by means of the pressure spring 47 on the rearward caliper section which is in one piece with the caliper; that is, FIG. 1 illustrates the operationally ready position of the application device inside the one-piece caliper. Then, the operating unit (which is not shown), preferably in the form of a pneumatically operable membrane cylinder, is fastened on the rearward opening 17 of the caliper such that the piston rod of the membrane cylinder acts upon the bearing shell or pan situated at the upper end of the rotary lever.

After the rearward end of the caliper has largely been closed, laterally accessible devices are provided which permit an access to the synchronizing device. According to FIG. 4 of the drawing, a closing device 65 is provided on the side of the caliper which is on the right in the drawing, which closing device, after the demounting, opens up a work opening into the interior of the caliper. When the application device is demounted, a machining of the support bearing for the supporting roller 23 can be carried out through the work opening. This can take place in the same manner on the left side on the caliper; that is, when the restoring unit 67 illustrated in FIG. 4 of the drawing is removed, whereby, in a manner comparable to the closing device 65, an opening into the interior of the caliper is exposed. After a covering 69 snapped onto it is removed, the restoring unit 67 permits an access, that is, an operation of the bevel wheel 49 shown on the left side in the drawing of FIG. 4. This means that, for the purpose of changing the lining, an operation of the resetting unit can take place by means of the restoring unit 67 while using the synchronizing device for both adjusting spindles.

The invention is not limited to the illustrated application device with the use of two adjusting spindles and also not to the special shaping of the bow spring 61 which holds together the preassembled unit. Instead of the two-spindle construction of the pneumatically applicable disk brake shown as an example, a single-spindle disk brake construction can be provided which is therefore equipped with only one adjusting spindle and one pressure piece. This means that the principle of the use of a one-piece caliper and of the application device which can be introduced as a preassembled unit into such a caliper can also be used in the case of constructions of those types known per se in which a central adjusting and pressure spindle can act upon a brake lining by means of a single pressure piece. Therefore, independently of the type of the application device, within the scope of the idea of the invention, the advantage can be achieved that the braking forces are transmitted by way of the supporting roller directly into the caliper; that is, in the case of tension and bending stress, no force transmission takes place by way of screwed-on housing parts which are subjected to leakage problems.

Although the invention has been described and illustrated in detail, it is to be clearly understood that same is by way of illustration and example, and is not to be taken by way of limitation. The spirit and scope of the present invention are to be limited only by the terms of the appended claims.

We claim:

1. Disk brake for road vehicles having a caliper which comprises a brake disk and on one side of which a brake application unit is arranged which has a rotary lever swivellable by an operating cylinder, the rotary lever being capable of acting by means of an eccentric onto a bridge which can be displaced against a spring force in the direction of the brake disk and has at least one adjusting spindle provided with a pressure piece, characterized in that a) the caliper is constructed in one piece such that the section of the caliper receiving the application unit is largely closed in a rearward area facing away from the brake disk, with the exception of an opening for the access of the operating cylinder, and b) the application unit is insertable as a preassembled unit into the caliper through the opening facing the brake disk when the caliper is removed from the brake disk.

2. Disk brake according to claim 1, characterized in that the opening of the caliper facing the brake disk, when the application unit is inserted, is closed off by a closing plate which is penetrated by at least one pressure piece.

3. Disk brake according to claim 2, wherein the bridge which can be operated by the eccentric of the rotary lever carrying two adjusting spindles which are screwed to it and have pressure pieces, and wherein the pressure pieces are in each case sealed off by means of bellows with respect to the closing plate penetrated by them.

4. Disk brake according to claim 1, characterized in that the application unit is joined together as a preassembled unit by means of a bow element.

5. Disk brake according to claim 4, wherein the bridge which can be operated by the eccentric of the rotary lever carrying two adjusting spindles which are screwed to it and have pressure pieces, and wherein the pressure pieces are in each case sealed off by means of bellows with respect to the closing plate penetrated by them.

6. Disk brake according to claim 4, characterized in that the bow element consists of a bow spring which, by means of one end, extends through the bridge of the application unit and, by means of the opposite end, in the form of a U-shaped bow, reaches around the rotary lever and its support bearing.

7. Disk brake according to claim 6, wherein the bridge which can be operated by the eccentric of the rotary lever carrying two adjusting spindles which are screwed to it and have pressure pieces, and wherein the pressure pieces are in each case sealed off by means of bellows with respect to the closing plate penetrated by them.

8. Disk brake according to claim 1, characterized in that the closing plate can be screwed to the caliper 1 by means of studs.

9. Disk brake assembly for vehicles, comprising a brake disk, a caliper, and a brake application unit with a rotary lever actuable by an eccentric onto a displaceable bridge with at least one adjustable spindle provided with at least one pressure piece which in use acts to press brake shoes against the brake disk, wherein the caliper is formed in one piece with a section receiving the brake application unit being substantially closed in an end area facing away from the brake disk, with an exception of an opening for access of an operation member engagable with the rotary lever, and wherein the brake application unit is insertable as a preassembled unit into the caliper through a caliper opening facing the brake disk when in an installed in use position.

10. Disk brake assembly according to claim 9, wherein said caliper opening is closed off by a closing plate when in an installed in use position, said closing plate being penetrated by the at least one pressure piece.

11. A method of making a disk brake assembly for vehicles of the type including a brake disk, a caliper, and a brake application unit with a rotary lever actuable by an eccentric to selectively push at least one brake shoe against the brake disk, said method comprising:

forming a one piece caliper with a section for accommodating the brake application unit which is substantially closed in an end area which in use faces away from the brake disk, said end area including an opening for an actuating member to engage the rotary lever, forming the brake application unit as a preassembled unit, inserting the preassembled brake application unit in the caliper through an insertion opening which in use faces the brake disk, and closing off the insertion opening with a cover plate which is penetrated by a pressure piece actuable against the at least one brake shoe.

*12. A caliper for use in a pneumatic air disk brake for road vehicles having a rotary lever actuated application device operable by an operating cylinder, the caliper comprising:*

*a housing section having an interior space sized to accommodate the rotary lever actuated application device, the housing section including at least one opening on a rearward end through which the operating cylinder is engageable with the rotary lever; and*

*a brake disk section extending from the housing section and engageable about a brake disk, said brake disk section and housing section being formed in one-piece.*

*13. The caliper according to claim 12, wherein the housing section of the caliper includes an opening facing the brake disk when in use through which the rotary lever actuated application device is capable of being received.*

*14. The caliper according to claim 12, wherein the rearward end of the caliper includes at least one additional opening through which the caliper is machined.*

*15. The caliper according to claim 14, wherein the additional opening is in a lateral wall of the rearward end of the housing section.*

*16. The caliper according to claim 13, wherein the rearward end of the caliper includes at least one additional opening through which the caliper is machined.*

*17. The caliper according to claim 16, wherein the additional opening is in a lateral wall of the rearward end of the housing section.*

*18. The caliper according to claim 12, wherein a rearward wall of the rearward end of the housing section receives brake responses forces introduced in a rearward manner when in use, whereby no-force transmission takes place within the caliper by way of screwed connectors placed in tension.*

*19. The caliper according to claim 13, wherein a rearward wall of the rearward end of the housing section receives brake responses forces introduced in a rearward manner when in use, whereby no-force transmission takes place within the caliper by way of screwed connectors placed in tension.*

*20. The caliper according to claim 14, wherein a rearward wall of the rearward end of the housing section receives brake responses forces introduced in a rearward manner when in use, whereby no-force transmission takes place within the caliper by way of screwed connectors placed in tension.*

*21. The caliper according to claim 12, wherein the rearward end of the housing section is largely closed.*

*22. The caliper according to claim 13, wherein the rearward end of the housing section is largely closed.*

*23. The caliper according to claim 14, wherein the rearward end of the housing section is largely closed.*

*24. The caliper according to claim 18, wherein the rearward end of the housing section is largely closed.*

*25. The caliper according to claim 13, further comprising a plate covering the opening in the housing section facing the brake disk, the plate having at least one opening penetratable by the rotary lever actuated application device.*

*26. The caliper according to claim 16, further comprising a plate covering the opening in the housing section facing the brake disk, the plate having at least one opening penetratable by the rotary lever actuated application device.*

*27. The caliper according to claim 19, further comprising a plate covering the opening in the housing section facing the brake disk, the plate having at least one opening penetratable by the rotary lever actuated application device.*

*28. The caliper according to claim 22, further comprising a plate covering the opening in the housing section facing the brake disk, the plate having at least one opening penetratable by the rotary lever actuated application device.*

*29. A pneumatic brake for road vehicles operable with a brake disk and actuated by an operating cylinder, the brake comprising:*

*a rotary lever adapted to be swivellable by the operating cylinder;*

*a bridge displaceable by swivelling action of the rotary lever;*

*at least one spindle arranged in the bridge and being displaceable with the bridge, the rotary lever, the bridge and the spindle being components of a brake application device for the pneumatic brake;*

*a caliper having a housing section sized to accommodate said components of the brake application device and a brake disk section extending from the housing section and configured to engage about the brake disk when installed;*

*wherein the housing section includes an opening on a rearward end through which the operating cylinder is engageable with the rotary lever, and an opening facing the brake disk when installed that is sized to receive said components of the brake application device.*

*30. The brake according to claim 29, further comprising:*

*a bow element joining together the rotary lever, bridge and spindle into a preassembled unit, the preassembled unit being insertable through the opening in the housing section of the caliper facing the brake disk.*

*31. The brake according to claim 29, wherein the housing section and the brake disk section of the caliper are constructed in one piece.*

*32. The brake according to claim 30, wherein the housing section and the brake disk section of the caliper are constructed in one piece.*

*33. The brake according to claim 29, wherein the rearward end of the housing section is largely closed.*

*34. The brake according to claim 30, wherein the rearward end of the housing section is largely closed.*

*35. The brake according to claim 31, wherein the rearward end of the housing section is largely closed.*

*36. The brake according to claim 32, wherein the rearward end of the housing section is largely closed.*

*37. The brake according to claim 29, wherein the opening through which the operating cylinder is engageable with the rotary lever is in a wall section of the rearward end, the wall section facing away from the brake disk.*

*38. The brake according to claim 30, wherein the opening through which the operating cylinder is engageable with the rotary lever is in a wall section of the rearward end, the wall section facing away from the brake disk.*

*39. The brake according to claim 31, wherein the opening through which the operating cylinder is engageable with the rotary lever is in a wall section of the rearward end, the wall section facing away from the brake disk.*

*40. The brake according to claim 33, wherein the opening through which the operating cylinder is engageable with the rotary lever is in a wall section of the rearward end, the wall section facing away from the brake disk.*

*41. The brake according to claim 29, further comprising at least one additional opening on the rearward end through which the caliper is machinable or the brake is seviceable.*

*42. The brake according to claim 30, further comprising at least one additional opening on the rearward end through which the caliper is machinable or the brake is seviceable.*

*43. The brake according to claim 31, further comprising at least one additional opening on the rearward end through which the caliper is machinable or the brake is seviceable.*

*44. The brake according to claim 37, further comprising at least one additional opening on the rearward end through which the caliper is machinable or the brake is seviceable.*

*45. The brake according to claim 41, wherein the additional opening is in a lateral wall section of the rearward end of the housing section.*

*46. The brake according to claim 42, wherein the additional opening is in a lateral wall section of the rearward end of the housing section.*

*47. The brake according to claim 43, wherein the additional opening is in a lateral wall section of the rearward end of the housing section.*

*48. The brake according to claim 44, wherein the additional opening is in a lateral wall section of the rearward end of the housing section.*

*49. The brake according to claim 41, wherein the additional opening is in a wall section of the rearward end facing away from the brake disk.*

*50. The brake according to claim 42, wherein the additional opening is in a wall section of the rearward end facing away from the brake disk.*

*51. The brake according to claim 43, wherein the additional opening is in a wall section of the rearward end facing away from the brake disk.*

*52. The brake according to claim 44, wherein the additional opening is in a wall section of the rearward end facing away from the brake disk.*

*53. The brake according to claim 41, wherein at least two additional openings are provided, a first being in a wall section of the rearward end facing away from the brake disk, and a second being in a lateral wall section of the rearward end of the housing section.*

*54. The brake according to claim 29, wherein an interior side of a rearward wall section of the rearward end receives brake response forces introduced in a rearward manner, whereby no-force transmission takes place within the caliper by way of screwed connectors placed in tension.*

*55. The brake according to claim 30, wherein an interior side of a rearward wall section of the rearward end receives brake response forces introduced in a rearward manner, whereby no-force transmission takes place within the caliper by way of screwed connectors placed in tension.*

*56. The brake according to claim 31, wherein an interior side of a rearward wall section of the rearward end receives brake response forces introduced in a rearward manner, whereby no-force transmission takes place within the caliper by way of screwed connectors placed in tension.*

*57. The brake according to claim 33, wherein an interior side of a rearward wall section of the rearward end receives brake response forces introduced in a rearward manner, whereby no-force transmission takes place within the caliper by way of screwed connectors placed in tension.*

*58. The brake according to claim 29, further comprising:*

*a pressure piece coupled with the spindle, the pressure piece being pressable against the brake disk when in use.*

*59. The brake according to claim 58, further comprising a bow element joining together the rotary lever, bridge, pressure piece and spindle into a preassembled unit, the preassembled unit being insertable through the opening in the housing section of the caliper facing the brake disk.*

*60. The brake according to claim 29, further comprising a plate covering the opening facing the brake disk when installed, the plate having at least one opening penetratable by the spindle.*

*61. The brake according to claim 60, further comprising:*

*a pressure piece coupled with the spindle, the pressure piece being pressable against the brake disk when in use.*

*62. The brake according to claim 61, further comprising a bellows arranged to seal off the pressure piece with respect to the penetratable opening in the closing plate.*

*63. The brake according to claim 29, wherein an interior side of a rearward wall section of the rearward end receives brake response forces introduced in a rearward manner, and*

*wherein the housing section is formed such that no force transmission of the brake response forces takes place through screwed connections that are subject to leakage problems into an interior of the caliper.*

*64. The brake according to claim 63, wherein the housing section and the brake disk section of the caliper are constructed in one piece.*

*65. The brake according to claim 30, wherein an interior side of a rearward wall section of the rearward end receives brake response forces introduced in a rearward manner, and*

*wherein the housing section is formed such that no force transmission of the brake response forces takes place through screwed connections that are subject to leakage problems into an interior of the caliper.*

*66. The brake according to claim 65, wherein the housing section and the brake disk section of the caliper are constructed in one piece.*

*67. A pneumatic disk brake, comprising:*

*a brake application device comprised of at least a rotary lever and one spindle;*

*a caliper having a first section that accommodates the brake application device, said first section having a first opening which, in use, faces a brake disk; and*

*wherein the rotary lever and the one spindle are received in the first section through the first opening.*

*68. The brake according to claim 67, wherein the brake application device further comprises a bridge carrying the one spindle.*

*69. The brake according to claim 68, further comprising a bow element used to join the rotary lever, the bridge and the one spindle into a preassembled brake application unit.*

*70. The brake according to claim 69, wherein the preassembled brake application unit is inserted into the first section through the first opening.*

*71. The brake according to claim 67, wherein the caliper further comprises a brake disk section extending from the first section that accommodates the brake application device, the brake disk section engaging over the brake disk when in use.*

*72. The brake according to claim 71, wherein the first section that accommodates the brake application device and the brake disk section are formed in one-piece.*

*73. The brake according to claim 67, wherein the first section that accommodates the brake application device is formed such that no force transmission of braking forces takes place through screwed connections that are subject to leakage problems.*

*74. The brake according to claim 67, further comprising a plate arranged to sealingly close the first opening, the plate being penetratable by a pressure piece arranged on an end of the one spindle.*

*75. The brake according to claim 70, further comprising a plate arranged to sealingly close the first opening, the plate being penetrable by a pressure piece arranged on an end of the one spindle.*

*76. The brake according to claim 67, wherein the first section of the caliper that accommodates the brake application device includes a second opening on a rearward end, the rotary lever being arranged inside the first section projecting in a direction of the second opening.*

*77. The brake according to claim 70, wherein the first section of the caliper that accommodates the brake application device includes a second opening on a rearward end, the rotary lever being arranged inside the first section projecting in a direction of the second opening.*

*78. A method of making a pneumatic disk brake, the method comprising the acts of:*

*forming a caliper section adapted to receive a rotary lever, a bridge and at least one spindle of a brake application device, said caliper section being formed with a first opening which, in use, faces a brake disk; and*

*inserting the rotary lever, the bridge and the at least one spindle into the caliper section through the first opening.*

*79. The method according to claim 78, further comprising the acts of:*

*preassembling at least the rotary lever, the bridge and the at least one spindle of the brake application device into a preassembled brake application unit; and*

*inserting the preassembled brake application unit into the caliper section through the first opening.*

*80. The method according to claim 79, further comprising the act of arranging the rotary lever inside the caliper section such that one end projects in a direction of a second opening situated on a rearward end of the caliper section.*

*81. The method according to claim 78, further comprising the act of arranging the rotary lever inside the caliper section such that one end projects in a direction of a second opening situated on a rearward end of the caliper section.*

*82. The method according to claim 78, further comprising the act of:*

*sealingly closing the first opening with a plate, which is penetrable by a pressure piece arranged on an end of the at least one spindle.*

*83. The method according to claim 79, further comprising the act of:*

*sealingly closing the first opening with a plate, which is penetrable by a pressure piece arranged on an end of the at least one spindle.*

*84. A method of making a pneumatic disk brake having a brake application device with a rotary lever, the method comprising the acts of:*

*forming an opening in a front side of a caliper section that accommodates the brake application device, which front side, in use, faces a brake disk; and*

*inserting the rotary lever of the brake application device through the opening into the caliper section.*

*85. The method according to claim 84, further comprising the act of:*

*arranging one end of the rotary lever near an opening formed in a rear side of the caliper section, the one end being adapted to be operated upon by an operating cylinder.*

*86. The method according to claim 85, wherein the act of inserting further comprises the acts of:*

*preassembling the rotary lever with other components of the brake application device to form a preassembled brake application unit; and*

*inserting the preassembled brake application unit through the opening.*

*87. The method according to claim 84, wherein the act of inserting further comprises the acts of:*

*preassembling the rotary lever with other components of the brake application device to form a preassembled brake application unit; and*

*inserting the preassembled brake application unit through the opening.*

*88. The method according to claim 84, further comprising the act of:*

*closing the opening in the front side with a plate, the plate being penetrable by a pressure piece coupled to the brake application device.*

*89. The method according to claim 87, further comprising the act of:*

*closing the opening in the front side with a plate, the plate being penetrable by a pressure piece coupled to the brake application device.*

*90. A method of making a pneumatic disk brake, the method comprising the acts of:*

*inserting components of a brake application device, including a rotary lever, into a section of a caliper that houses the brake application device through an opening in a front side of the section which, in use, faces and is exposed to a brake disk; and*

*positioning one end of the rotary lever, engageable by an operating cylinder, near an opening on a rearward end of the section.*

*91. The method according to claim 90, wherein the components of the brake application device comprise the rotary lever and at least one spindle.*

*92. The method according to claim 91, wherein the components of the brake application device further comprise a bridge which carries the at least one spindle, said bridge being displaceable by rotation of the rotary lever.*

*93. The method according to claim 92, wherein the bridge carries two spindles.*

*94. The method according to claim 90, wherein the act of inserting the components comprises the acts of:*

*preassembling the rotary lever with the components of the brake application device into a preassembled rotary lever actuated brake application unit; and*

*inserting the preassembled rotary lever actuated brake application unit into the section of the caliper through the opening.*

*95. The method according to claim 92, wherein the act of inserting the components comprises the acts of:*

*preassembling the rotary lever with the components of the brake application device into a preassembled rotary lever actuated brake application unit; and*

*inserting the preassembled rotary lever actuated brake application unit into the section of the caliper through the opening.*

*96. The method according to claim 94, further comprising the act of:*

*closing the opening in a sealing manner with a plate, the plate being penetrable by a pressure piece that is acted upon by the brake application device.*

*97. The method according to claim 95, further comprising the act of:*

*closing the opening in a sealing manner with a plate, the plate being penetrable by a pressure piece that is acted upon by the brake application device.*

*98. A method of making a disk brake assembly for vehicles of the type including a brake disk, a caliper, and a brake application device with a rotary lever that acts via an eccentric to selectively push at least one brake shoe against the brake disk, said method comprising the acts of:*

*forming a caliper section for accommodating the brake application unit having an end area which, in use, faces away from the brake disk, said end area including an opening for an actuating member to engage the rotary lever;*

*forming the brake application device as a preassembled unit; and*

*inserting the preassembled brake application unit in the caliper section through an insertion opening which, in use, faces the brake disk, and closing off the insertion opening with a cover plate which is penetrable by a pressure piece capable of acting against the at least one brake shoe.*

* * * * *